June 18, 1935.  F. FAUSETT  2,005,138
ELECTRIC METERING DEVICE
Filed Feb. 5, 1932

Inventor
Floyd Fausett

By
Knight Bros.
Attorneys

Patented June 18, 1935

2,005,138

UNITED STATES PATENT OFFICE 2,005,138

ELECTRIC METERING DEVICE

Floyd Fausett, Greenwood, Miss., assignor to Supreme Instruments Corporation, Greenwood, Miss.

Application February 5, 1932, Serial No. 591,201

2 Claims. (Cl. 250—20)

This invention relates to a metering arrangement for electrical energies. The same is particularly adapted for measuring the output energies of radio receivers.

It is the object of my invention to provide a metering arrangement which will accurately indicate the output energies of a circuit under actual operating conditions. Furthermore, my metering connections, comprising a high impedance meter of high sensitivity, are so effected that the normally operating characteristics of the measured circuit are negligibly affected thereby.

It is a further object of my invention to make possible the above indications with connections of the simplest type, made at the most accessible points.

Other objects and advantages characterizing the invention are set forth in the following description and particularly pointed out in the appended claims, reference being made to the accompanying drawing which illustrates a preferred embodiment thereof.

Figure 1:
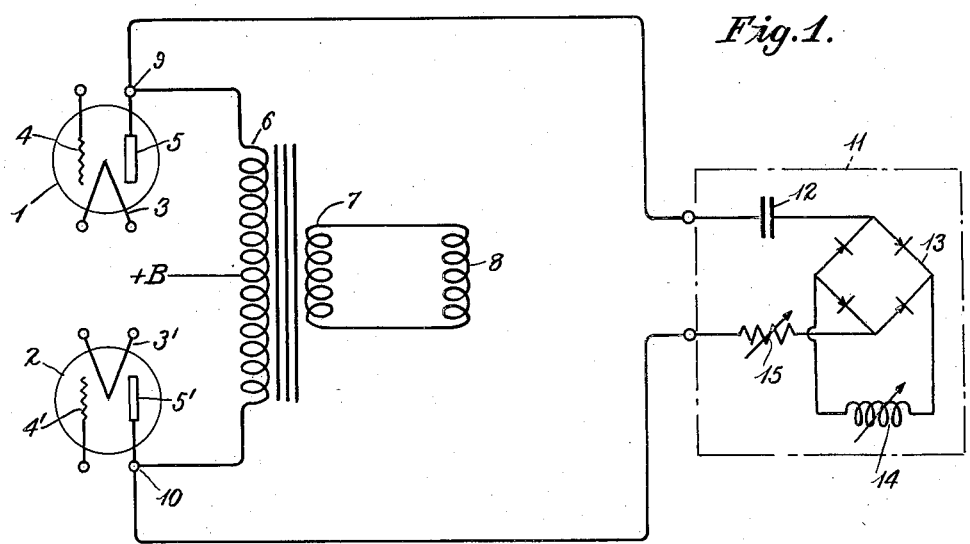
Figure 2:
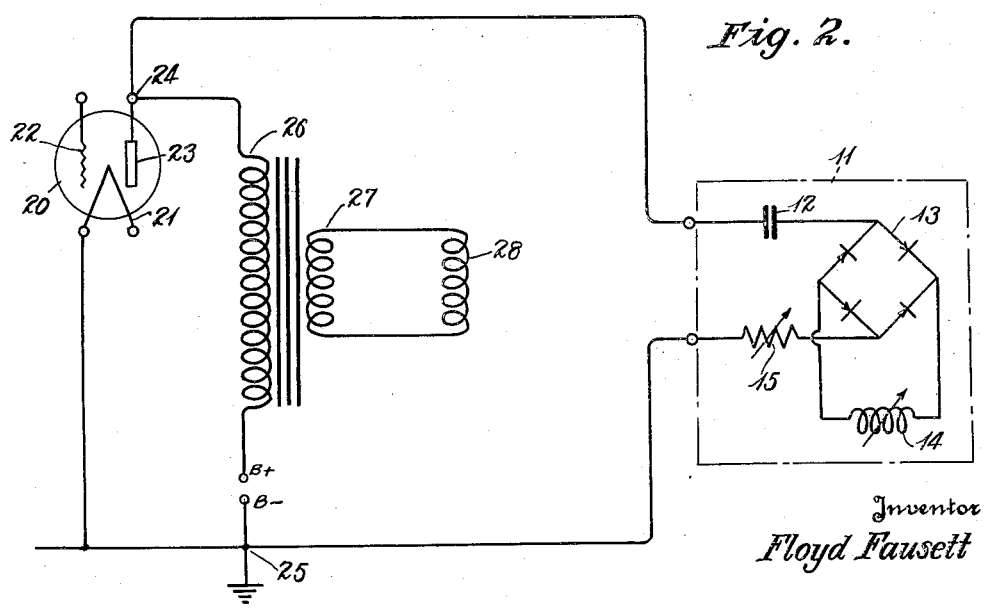

Fig. 1 illustrates my novel metering circuit associated with a push-pull audio frequency amplifier, and Fig. 2 illustrates my novel metering circuit associated with a single tube audio frequency amplifier.

In Fig. 1 are illustrated two audion tubes 1 and 2 comprising heated filaments 3, 3', grid elements 4, 4', and plate elements 5, 5', respectively. The detailed circuit connections of all of these elements which form a push-pull amplifying stage are not shown, since they do not constitute the essence of my invention. The plates 5, 5' are shown energized by means of a potential source B+ applied through the two halves of the primary winding 6 of the output transformer. The amplified audio frequency energies which traverse this primary winding are coupled through the secondary winding 7 to the voice coil of a loud speaker 8. In view of the fact that the mechanical connections of reproducers to the output circuits of radio receivers are not uniform, it is difficult and sometimes impossible to apply meter connections to these output circuits. Even when the connections are possible, it is necessary that the circuits be intercepted by the metering devices, which results in a great deal of time and labor lost in making and breaking the various connections. By my invention, I am enabled to apply my metering circuit in such a manner that the specific connections of the output circuit of the radio receiver with the reproducer is immaterial. I apply the leads from my metering instrument to the plate terminals of the tubes at 9 and 10. This may be done effectively by the use of adapters mounted upon the respective tube sockets. Thereby sufficient energy is shunted away from my amplifying circuit to effect all the necessary measurements. Also the impedance of the shunt circuit may be varied in accordance with operating requirements.

The metering assembly 11 comprises a condenser 12 of about 1.0 microfarad capacity in series with a copper oxide rectifier 13 and a sensitive galvanometer movement 14. The meter also contains a variable resistance 15 which is employed to limit the meter input to a value of less than 1 milliampere which is the full scale indication of the meter.

The capacitance 12 serves to segregate only the alternating audio frequency energies from the radio receiver output circuit for rectification by element 13 and measurement by the movement 14. The energies thus shunted away from the radio circuit are very slight and do not affect the output characteristics of that circuit in any material degree. However, the measurements indicated by the highly sensitive meter 15 give an accurate indication of the output conditions of the radio receiver under actual operating conditions of the latter. The method of shunting this radio energy from the output circuit makes possible the simple form of connection of the metering device and also serves not to vary the actual circuit constants of the output circuit from those existing during normal operating conditions.

In Fig. 2 is illustrated a single tube amplifying stage consisting of audion tube 20 with a heated filament 21, grid 22, and plate 23, connected with the output transformer 26, 27. The voice coil of the speaker 28 is connected to the secondary winding 27 of the transformer, as in Fig. 1. The indicating assembly 11 is connected across the output of the tube at the points 24 and 25. An adapter may be employed to efficiently make these connections. The metering arrangement operates in the same manner as explained in conjunction with Fig. 1.

Having described my invention,

I claim:—

1. In a radio testing device for measuring the audio frequency energy in an output circuit of a radio broadcast receiving set, a meter of high sensitivity, a rectifier for the energy measured by said meter, detachable conductors for externally connecting said rectifier and meter across said output circuit of a receiving set, and a capacitance element disposed in said conductors to segregate the audible components of the output energy.

2. In a radio testing device for measuring the audio frequency energy in an output circuit of a radio broadcast receiving set, a meter of high sensitivity comprising a direct current galvanometer unit, a rectifier for the energy measured by said meter, detachable conductors for externally connecting said rectifier and meter across said output circuit of a receiving set, and a capacitance element disposed in said conductors to segregate the audible components of the output energy.

FLOYD FAUSETT.